Aug. 18, 1953      G. H. LOVETT      2,649,472
PROCESS FOR PRODUCING ACRYLONITRILE
Filed Aug. 28, 1950
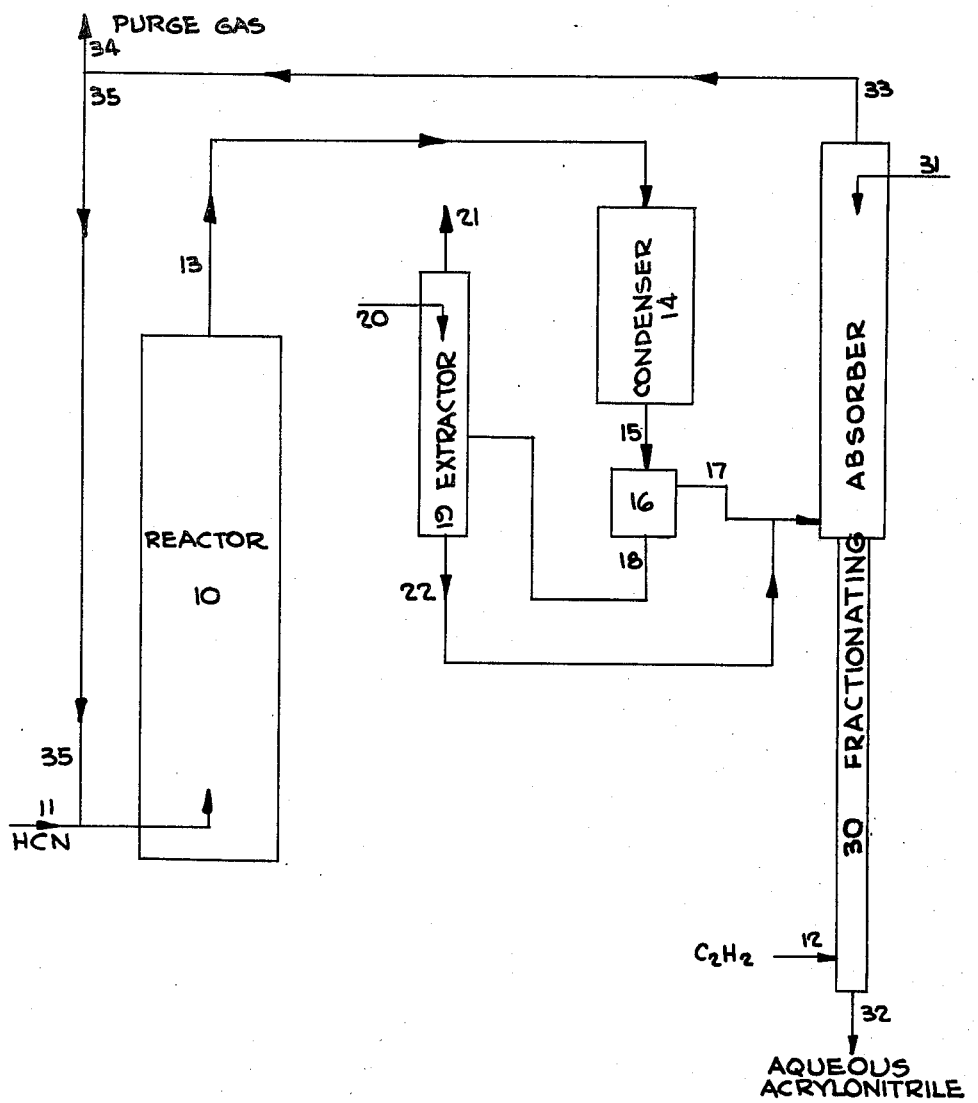
INVENTOR.
GORDON H. LOVETT
BY
*Herman O. Bauermeister*
ATTORNEY Patented Aug. 18, 1953

2,649,472

UNITED STATES PATENT OFFICE 2,649,472

PROCESS FOR PRODUCING ACRYLONITRILE

Gordon H. Lovett, Dayton, Ohio, assignor to Monsanto Chemical Company, St. Louis, Mo., a corporation of Delaware Application August 28, 1950, Serial No. 181,745

6 Claims. (Cl. 260—465.3)

This invention provides an improved process for producing acrylonitrile.

When acrylonitrile is formed by the reaction of acetylene with hydrocyanic acid in the presence of acidic cuprous chloride solution, as described in BIOS (British Intelligence Objectives Sub-Committee, 1947; London, England) Report No. 1057, and also in U. S. Patent No. 2,486,659, of November 1, 1949, the reactor effluent contains acrylonitrile together with minor amounts of by-products and a large excess of acetylene. It is customary in this process to remove the acrylonitrile from the reactor effluent by water scrubbing and then to recycle the excess acetylene.

When distillation of the crude acrylonitrile is attempted, the more volatile chlorobutadiene and monovinyl acetylene are first vaporized and thus separated from the higher boiling acrylonitrile. However, it has been found that during distillation of the crude product, these more volatile materials undergo polymerization with the result that the upper part of the distillation column in which such distillation is carried out, is rapidly filled with a solid polymer, making necessary the frequent interruption of the operation for cleaning purposes. It has also been found that the acrylonitrile and divinyl acetylene form an azeotrope boiling at 75° C., whereas pure acrylonitrile boils at 77° C., both temperatures referring to the atmospheric pressure boiling points. This fact further complicates the production of a grade of acrylonitrile suitable for the production of high molecular weight polymers.

The by-products obtained in the above described reaction may be divided into two classes according to their solubility in water: those components which are much less soluble than acrylonitrile (chlorobutadiene, vinyl acetylene and divinyl acetylene) and those components which have solubilities of the same order of magnitude or greater than the solubility of acrylonitrile in water (lactonitrile, acetaldehyde, hydrogen cyanide and cyanobutadiene). If a fractionating absorber, as described in my copending application, Serial No. 101,201, filed June 24, 1949, is used for removing the impurities from the acrylonitrile from the reactor effluent, the components less soluble in water than acrylonitrile remain in the recycle acetylene and some method must be provided for their removal from the system.

It has now been found that the removal of these relatively water-insoluble components which are also the most readily polymerizable impurities occurring in the chemical reaction can be accomplished by means of a partial condensation process which is effected by cooling the gases leaving the catalytic reactor so as to obtain a liquid condensate containing a portion of the components which are less soluble in water than acrylonitrile together with a substantial portion of acrylonitrile, then adding sufficient water or other inert solvent to the said condensate to extract substantially all of the acrylonitrile therefrom. The proportion of the gases leaving the catalytic reactor which is condensed may be varied over a considerable range. However, for best results I have found that when from 20% to 60% by weight of the acrylonitrile present in the reactor gases is condensed, such condensate generally contains an amount of the readily polymerizable impurities corresponding to the incremental production or net make of these impurities above the recycle level. In other words, the present process provides a means for continuously removing from the system the polymerizable impurities in the amount in which they are formed.

The polymerizable impurities, less soluble in water than acrylonitrile, are released from the condensate in a concentrated form and may be recovered and disposed of without the necessity of additional treatment to recover acrylonitrile therefrom.

In this way the polymerizable impurities such as chlorobutadiene, monovinyl acetylene and divinyl acetylene are to a large extent removed from the product gas stream. The gas stream, after removal of the above impurities, contains the balance of the acrylonitrile with minor amounts of chlorobutadiene, monovinyl acetylene and divinyl acetylene, water vapor and acetylene. The gas stream is then contacted with and dissolved in a body or stream of water which is in turn contacted with the stream of gaseous acetylene. In this way, a fractionation takes place by the stripping action of acetylene, as described in my copending application, above referred to, and the minor amounts of the chlorobutadiene, monovinyl acetylene and divinyl acetylene removed therefrom. However, it will be understood by reason of the initial condensation and treatment above described, the amounts of the above impurities removed by the acetylene are now so much lower that removal of these impurities from the acetylene is no longer necessary. Accordingly, the acetylene, after contacting the said water solution, may be returned directly to the catalytic reactor for combination with additional hydrocyanic acid for the production of acrylonitrile.

The partial condensation referred to above is preferably carried out by cooling the reactor gases to obtain a liquid condensate at a temperature within the range of from −3° C. to +18° C. A two-phase condensate is obtained at this point, the condensate consisting of a lighter organic phase and a heavier aqueous phase. The polymerizable impurities are found in the organic phase. Some acrylonitrile is also present in this phase. The lower or aqueous layer comprises water containing some dissolved acrylonitrile.

My invention is illustrated by means of the accompanying drawing showing a diagrammatic flow sheet of the present process. Only the essential process units are indicated in the flow sheet.

In the drawing, 10 indicates a reactor containing a hydrochloric acid solution of cuprous chloride. Other cuprous salts such as the halides in general may also be employed. A supply of hydrocyanic acid (HCN) enters through pipe 11, while 12 indicates a supply of acetylene ($C_2H_2$). The acetylene is supplied to fractionating absorber 30, through which it passes, leaving by pipe 33 and being introduced thereby into pipes 35 and 11 and thence into reactor 10. Generally the amount of acetylene supplied to the reactor is from 8 to 10 times the molar equivalent of hydrocyanic acid, although this ratio is variable, depending upon the activity and age of the catalytic solution. The two reactants may also be supplied independently if desired. The temperature of the catalytic solution is maintained at about 80° C. Due to the action of the catalytic solution, the hydrocyanic acid combines with acetylene, forming mainly acrylonitrile. At the same time appreciable amounts of certain undesired impurities are produced which appear, together with the acrylonitrile, in the reactor effluent. The products of the reaction leave the reactor by pipe 13 and comprise the following the approximate proportions indicated:

| | Moles |
|---|---|
| Acrylonitrile | 10.00 |
| Acetylene | 80.00 |
| Hydrocyanic acid | 0.6 |
| Vinyl chloride | 6.6 |
| Acetaldehyde | 0.5 |
| Chlorobutadiene | 0.1 |
| Monovinyl acetylene | 5.5 |
| Divinyl acetylene | 0.25 |
| Cyanobutadiene | 0.26 |
| Lactonitrile | 0.15 |
| Water | 67.00 |

The above products are subjected to partial condensation in condenser 14 and then passed by means of pipe 15 into a gas-liquid separator 16. The gaseous acrylonitrile and water vapor leave the separator by means of pipe 17. The liquid partial condensate leaves separator 16 by means of line 18 and passes to extractor 19.

The extractor 19 receives the condensate which is of such composition that it separates into two liquid phases, namely, an upper organic and a lower aqueous phase. An inert solvent, such as water is supplied to the extractor 19 by means of pipe 20. The extraction operation may be carried out at any convenient temperature, utilizing water or other suitable solvent at the temperature at which it is normally available. The amount of water utilized is sufficient to dissolve the acrylonitrile, thereby yielding a water solution containing from about 3% by weight to 7% by weight of acrylonitrile measured at 20° C., although the use of higher temperature water may may result in concentrations as high as 15%. The water removes any acrylonitrile present in the organic liquid layer, the residual, organic constituents being then removed as a liquid by pipe 21. The organic constituents so removed comprise polymerizable impurities such as chlorobutadiene, monovyinl acetylene and divinyl acetylene. The added water and dissolved acrylonitrile enter the lower aqueous phase which is then removed by means of line 22.

The aqueous stream of acrylonitrile in line 22 may be conveyed directly to the fractionating absorber 30, or may first be combined or mixed with the uncondensed vapor passing through line 17 as shown in the figure. In this case the mixture of liquid and vapor is passed directly to the absorber 30.

The fractionating absorber 30 is provided at a lower point thereof with a stream of acetylene as described above entering by means of pipe 12. A stream of water is introduced into the upper part of the fractionating absorber 30 by means of the pipe 31. The water so entering absorber 30 passes downwardly in contact with the rising stream of acetylene, sufficient water being employed to dissolve the acrylonitrile present in the gas stream. Acrylonitrile enters the absorber 30 by pipes 17 and 22 and is discharged as a water solution by means of pipe 32. The overhead gaseous stream from the absorber 30 is conveyed by means of pipe 33 to a purge 34 from which a part of the acetylene may be vented, to the atmosphere or used for other purposes. Recycle acetylene flows through pipes 35 and 11 back to reactor 10. This stream consists mainly of acetylene together with a minor proportion of hydrocyanic acid and other readily volatilizable components.

The less readily polymerizable impurities such as $CH_3CHO$, cyanobutadiene and lactonitrile formed in the process are substantially completely found in the water stream leaving the absorber by means of pipe 32. The acetaldehyde reaches the fractionating absorber 30 after having passed through the partial condenser 14 and separator 16 without appreciable condensation. The vinyl chloride which is also a less readily polymerizable impurity is vented from the extractor 19 by means of pipe 21 together with the chlorobutadiene, monovyinl acetylene and divinyl acetylene.

The process of the present invention is preferably carried out at atmospheric pressure or may be carried out at pressures ranging upwardly to as high as two atmospheres.

While I have described a preferred form of my invention it is understood that this is by way of illustration only and various changes may be made within the scope of the appended claims without departing from the spirit of the invention.

I claim:

1. The process which comprises partially condensing a gaseous mixture of acrylonitrile containing chlorobutadiene, monovinyl acetylene, divinyl acetylene, and water to obtain a liquid condensate composed of an organic phase and a water phase, adding water to said organic phase to dissolve acrylonitrile, separating undissolved chlorobutadiene, monovinyl acetylene, and divinyl acetylene from the combined water solution of acrylonitrile, combining the said water solution of acrylonitrile with the uncondensed portion of the aforementioned gas mixture, contacting the combined solution with gaseous acetylene, whereby residual chlorobutadiene, monovinyl acetylene, and divinyl acetylene present in said solution are transferred to the gas phase, and a water solution of acrylonitrile substantially free of chlorobutadiene, monovinyl acetylene, and divinyl acetylene is obtained.

2. In a process for synthesizing acrylonitrile by the reaction of acetylene and hydrocyanic acid in an acid solution of cuprous halides to produce a gaseous mixture comprising acrylonitrile, chlorobutadiene, monovinyl acetylene, divinyl acetylene and water, the improvement which comprises cooling said mixture to obtain a liquid condensate composed of an organic phase comprising a portion of said chlorobutadiene, monovinyl acetylene, divinyl acetylene and acrylonitrile and a water phase including the remainder of the said condensed acrylonitrile, adding water to said condensate in amount sufficient to dissolve substantially all of the said acrylonitrile but only a portion of the said chlorobutadiene, monovinyl acetylene and divinyl acetylene present in the said organic phase, separating the undissolved chlorobutadiene, monovinyl acetylene and divinyl acetylene from the said combined water solution, contacting the said combined water solution with gaseous acetylene whereby the residual chlorobutadiene, monovinyl acetylene and divinyl acetylene present in said water solution are transferred to the gas phase, and a water solution of acrylonitrile substantially free of chlorobutadiene, monovinyl acetylene and divinyl acetylene is obtained, and then contacting said gaseous acetylene with hydrocyanic acid in the presence of an acid solution of cuprous halides to form additional acrylonitrile.

3. In a process for synthesizing acrylonitrile by the reaction of acetylene and hydrocyanic acid in an acid solution of cuprous halides to obtain a gaseous mixture comprising acrylonitrile, chlorobutadiene, monovinyl acetylene, divinyl acetylene and water, the improvement which comprises cooling said mixture to obtain a liquid condensate composed of an organic phase comprising a portion of said chlorobutadiene, monovinyl acetylene, divinyl acetylene and acrylonitrile and a water phase containing from 20% to 60% of the said original acrylonitrile, adding water to said condensate in amount sufficient to dissolve substantially all of the said acrylonitrile but only a portion of the said chlorobutadiene, monovinyl acetylene and divinyl acetylene present in said organic phase, separating the undissolved chlorobutadiene, monovinyl acetylene and divinyl acetylene from said combined water solution, combining the said water solution with the uncondensed portion of the aforementioned gas mixture, contacting the combined solution with gaseous acetylene whereby the residual chlorobutadiene, monovinyl acetylene and divinyl acetylene present in said combined water solution are transferred to the gas phase, and a water solution of acrylonitrile substantially free of chlorobutadiene, monovinyl acetylene and divinyl acetylene is obtained, and then contacting said purified gaseous acetylene with hydrocyanic acid in the presence of an acid solution of cuprous halide to form additional acrylonitrile.

4. In a process for synthesizing acrylonitrile by the reaction of acetylene and hydrocyanic acid in an acid solution of cuprous salts to obtain a gaseous mixture comprising acrylonitrile, chlorobutadiene, monovinyl acetylene, divinyl acetylene and water, the improvement which comprises cooling said mixture to obtain a liquid condensate at a temperature of −3° to +18° C. composed of an organic phase comprising a portion of said chlorobutadiene, monovinyl acetylene, divinyl acetylene and acrylonitrile and a water phase including the remainder of the said condensed acrylonitrile, adding water to said condensate to dissolve the said acrylonitrile present in said condensate, separating the said water solution from the said organic phase, contacting the said water solution with gaseous acetylene whereby the said chlorobutadiene, monovinyl acetylene, and divinyl acetylene present in said water solution are transferred to the gas phase, and a water solution of acrylonitrile substantially free of chlorobutadiene, monovinyl acetylene and divinyl acetylene is obtained.

5. In a process for synthesizing acrylonitrile by are reaction of acetylene and hydrocyanic acid in an acid solution of cuprous salts to obtain a gaseous mixture comprising acrylonitrile, chlorobutadiene, monovinyl acetylene, divinyl acetylene and water, the improvement which comprises cooling said mixture to obtain a liquid condensate composed of an organic phase comprising a portion of said chlorobutadiene, monovinyl acetylene, divinyl acetylene and acrylonitrile and a water phase including the remainder of the said condensed acrylonitrile, adding water to said condensate in amount sufficient to dissolve the said acrylonitrile present in said organic phase, separating said water solution and combining the same with the uncondensed portion of aforementioned gaseous mixture, contacting the combined solution with gaseous acetylene whereby the said chlorobutadiene, monovinyl acetylene and divinyl acetylene present in said solution are transferred to the gas phase and a water solution of acrylonitrile substantially free of chlorobutadiene, monovinyl acetylene and divinyl acetylene is obtained.

6. In a process for synthesizing acrylonitrile by the reaction of acetylene and hydrocyanic acid in an acid solution of cuprous halides to obtain a gaseous mixture comprising acrylonitrile, chlorobutadiene, monovinyl acetylene, divinyl acetylene and water, the improvement which comprises cooling said mixture to obtain a liquid condensate composed of an organic phase comprising a portion of said chlorobutadiene, monovinyl acetylene, divinyl acetylene, and acrylonitrile, and a water phase including the remainder of the said condensed acrylonitrile, adding water to said condensate in amount sufficient to dissolve substantially all of the said acrylonitrile but only a portion of the said chlorobutadiene, monovinyl acetylene, and divinyl acetylene present in the said condensate, separating the undisolved chlorobutadiene, monovinyl acetylene, and divinyl acetylene from said combined water solution, contacting the said combined water solution with gaseous acetylene whereby the residual chlorobutadiene, monovinyl acetylene, and divinyl acetylene present in said water solution are transferred to the gas phase and a water solution of acrylonitrile substantially free of chlorobutadiene, monovinyl acetylene, and divinyl acetylene is obtained.

GORDON H. LOVETT.

References Cited in the file of this patent

UNITED STATES PATENTS

| Number | Name | Date |
|---|---|---|
| 2,324,854 | Kurtz | July 20, 1943 |
| 2,417,635 | Davis | Mar. 18, 1947 |
| 2,526,676 | Lovett | Oct. 24, 1950 |